United States Patent
Turri et al.

(10) Patent No.: US 7,358,306 B2
(45) Date of Patent: Apr. 15, 2008

(54) CURABLE POLYURETHANES

(75) Inventors: Stefano Turri, Milan (IT); Sergio Novelli, Asti (IT); Anna Staccione, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/177,859

(22) Filed: Jun. 20, 2002

(65) Prior Publication Data

US 2003/0139540 A1  Jul. 24, 2003

(30) Foreign Application Priority Data

Jun. 21, 2001  (IT)  ........................ MI2001A1306

(51) Int. Cl.
*C08L 75/14* (2006.01)
*C08L 75/08* (2006.01)
*C08G 71/04* (2006.01)

(52) U.S. Cl. ...................... 525/130; 525/126; 525/455; 525/460; 528/70; 528/76

(58) Field of Classification Search ................ 525/123, 525/130, 131
See application file for complete search history.

(56) References Cited

U.S. PATENT DOCUMENTS

| | | | | |
|---|---|---|---|---|
| 2,431,921 A | * | 12/1947 | Cook et al. | ................ 525/447 |
| 3,242,218 A | | 3/1966 | Miller | |
| 3,715,378 A | | 2/1973 | Sianesi et al. | |
| 3,810,874 A | | 5/1974 | Mitsch et al. | |
| 4,523,039 A | | 6/1985 | Lagow et al. | |
| 4,647,413 A | | 3/1987 | Savu | |
| 4,782,130 A | | 11/1988 | Re et al. | |
| 4,983,666 A | * | 1/1991 | Zavatteri et al. | ............ 524/539 |
| 5,026,814 A | * | 6/1991 | Re et al. | ........................ 528/61 |
| 5,043,410 A | * | 8/1991 | Re et al. | ........................ 528/70 |
| 5,149,842 A | | 9/1992 | Sianesi et al. | |
| 5,189,135 A | * | 2/1993 | Cozzi et al. | .................. 528/70 |
| 5,204,441 A | | 4/1993 | Baum et al. | |
| 5,258,110 A | | 11/1993 | Sianesi et al. | |
| 5,837,774 A | | 11/1998 | Tarumi et al. | |
| 5,936,037 A | * | 8/1999 | Tasaka | ..................... 525/92 B |
| 5,962,611 A | | 10/1999 | Meijs et al. | |
| 6,001,923 A | * | 12/1999 | Moncur et al. | ............. 524/590 |
| 6,020,450 A | | 2/2000 | Matsuda et al. | |
| 6,066,697 A | * | 5/2000 | Coran et al. | ................ 525/193 |
| 6,127,507 A | * | 10/2000 | Santerre | ...................... 528/66 |

FOREIGN PATENT DOCUMENTS

| | | |
|---|---|---|
| EP | 0 148 482 A2 | 12/1984 |
| EP | 0 239 123 A2 | 3/1987 |
| EP | 273449 A1 * | 7/1988 |
| EP | 0 340 740 A2 | 5/1989 |
| EP | 0 359 273 A2 | 9/1989 |
| EP | 0 359 271 A | 3/1990 |
| EP | 0 548 745 A | 6/1993 |
| EP | 0 621 298 A2 | 4/1994 |
| GB | 1104482 | 4/1965 |
| WO | WO 90/03357 | 9/1989 |
| WO | 93/18391 A | 9/1993 |

OTHER PUBLICATIONS

English abstract of JP 03-207757 A, Kobayashi et al. Sep. 1991.*
Encyclopedia of Polymer Science vol. 6; p. 522-524; 1987.*
Encyclopedia of Polymer Science vol. 7; p. 807-810; 1987.*
Grant & Hackh's Chemical Dictionary p. 431; 1990.*
Morrison, "Organic Chemistry 3$^{rd}$ Edition", chapter 9 p. 286.*
Oertel, "Polyurethane Handbook", p. 18-19, 1993.*
W.A. Zisman, "Contact Angle, Wettability and Adhesion" Advances in Chemistry Series, vol. 43, American Chemical Society, Washington, DC, 1964.

* cited by examiner

*Primary Examiner*—David J. Buttner
(74) *Attorney, Agent, or Firm*—Bryan Cave LLP

(57) ABSTRACT

Curable (per)fluoropolyether polyurethanes obtained by reaction in a first step of
a) (per)fluoropolyether diols having a number average molecular weight from 2,000 to 5,000;
with
b) diisocyanates of formula $$\text{OCN—R—NCO} \qquad \text{(VIA)}$$

wherein R is a hydrogenated and/or fluorinated radical;
in a second step with the compound
c) saturated or unsaturated aliphatic hydrogenated diols, (alkyl)cycloaliphatic, aromatic; oligomers or polymers of butadiene with a number average molecular weight from 500 to 4,000 having end hydroxyl groups;
provided that:
when the diisocyanate b) is used and the radical R in formula (VIA) is: —Ph—CH$_2$—Ph—, the hydrogenated diols c) are optional;
when the radical R has a meaning different from that above mentioned, at least one of the used hydrogenated diols c) is selected from those belonging to the c$^2$)-c$^6$) groups;
the sum of the equivalents of the compounds a) and c) being equal to the equivalents of the compound b).

22 Claims, No Drawings

CURABLE POLYURETHANES

The present invention relates to curable elastomers which give cured rubbers suitable to prepare manufactured articles, in particular O-ring and gaskets, capable to maintain elastomeric properties at very low temperatures, also of −60° C., preferably of −70° C., having improved mechanical properties, in particular high hardness, also higher than 70 Shore A, preferably higher than 80 Shore A, combined with improved chemical resistance and to solvents (lower swelling) and having the characteristic to be processable with the rubber processing technologies in open or closed mixers.

It is known that hydrogenated elastomers cannot be used to prepare the above gaskets due to the high swelling to solvents, for example hydrocarbons.

Fluorinated rubbers are also known, for example Tecnoflon®, which shows an excellent chemical resistance and to solvents, excellent sealing properties, but they have the drawback not to be usable at low temperatures, for example lower than −20° C.÷−30° C.

Rubbers containing perfluoropolyether blocks are known which have excellent elastomeric properties at low temperature and chemical resistance and to solvents, but they have the drawback to have a poor hardness, generally lower than 70 Shore A. Furthermore said rubbers have the drawback not to be processable with the conventional rubber technologies (open or closed mixers). For this purpose see U.S. Pat. No. 5,837,774 which describes curable rubbers containing PFPEs and having terminal unsaturations of olefinic type. They are cured by hydrosilylation with polysilanes and Pt catalysts. As said, the above cured rubbers do not show a hardness higher than 70 Shore A. Besides the used catalysts are very expensive and easily poisonable, and therefore a specific equipment is required for obtaining said crosslinkable elastomers, which is not accessible to the most of the elastomer substances transformers.

U.S. Pat. No. 6,020,450 describes polymers based on PFPEs and siloxanes, having alkoxysilane chain end groups. Said polymers can be used to prepare elastomers, or as release agents in silicone formulations. Also in this case the cured products show a low hardness. Besides above polymers are not suitable to prepare blends with conventional rubbers, such as EPDM, since they do not cure with the curing agents of the hydrogenated rubbers.

PFPE-based polyurethanes are also known. They however have the drawback that the crosslinking process is very quick. In fact after few seconds the viscosity of the prepolymer under reaction becomes very high, whereby it is practically not possible to compound said polymers with fillers and additives. Therefore it is not possible to modulate the mechanical properties of a predetermined basis composition. In order to modulate said properties it is necessary to change the monomeric composition of the polymer. This is a drawback from the industrial point of view since it requires frequent changements of the basis polymer production with consequent increase of costs. See for example EP 359,273 and U.S. Pat. No. 4,782,130 which describe linear or crosslinked polyurethanes having elastomeric properties, obtained starting from (per)fluoropolyether diols. The crosslinked structures are obtained by adding to the fluorinated prepolymer, obtained by reacting the PFPE diol with polyisocyanates, compounds having a low molecular weight, both aliphatic and aromatic, suitably functionalized, such for example triols, tetraols or triamines, or alternatively isocyanate trimers. Besides said polyurethanes are obtainable only by casting, by adding the crosslinking agent immediately before the casting in the mould. Therefore the manufactured article in this case can be prepared only during the elastomer synthesis. The rubber cannot be processed in conventional rubber equipments, such, as said, mixers.

Fluorinated thermoprocessable elastomers containing (per)fluoropolyether sequences, obtainable by polycondensation, are known in the prior art. See EP 621,298. The obtained elastomers show an improved flexibility at low temperature, but they have the drawback to have a very low chemical resistance and to solvents.

U.S. Pat. No. 5,204,441 describes polyurethane elastomers containing branched perfluoroalkyl groups. The polyurethanes obtained according to said patent show improved processability, however these polyurethanes are not usable at low temperatures.

The need was felt to have available elastomers allowing to overcome the above drawbacks of the fluorinated polyurethanes of the prior art, and having therefore the combination of the above properties.

The Applicant has surprisingly and unexpectedly found crosslinkable elastomeric polymers capable to solve the above technical problem.

An object of the present invention are curable (per)fluoropolyether polyurethanes obtained by reaction among the following compounds:
a) (per)fluoropolyether diols having a number average molecular weight from 2,000 to 5,000, preferably from 2,500 to 4,000;
b) diisocyanates of formula $$OCN—R—NCO \qquad (VIA)$$

wherein R is a hydrogenated and/or fluorinated radical;
c) hydrogenated diols selected from one or more of the following:
   $c^1$) $C_2$-$C_{12}$ aliphatic diols;
   $c^{1A}$) $C_6$-$C_{18}$ (alkyl)cycloaliphatic or (alkyl)aromatic diols, optionally comprising in the molecule two aliphatic or aromatic rings having 6 carbon atoms;
   $c^2$) unsaturated aliphatic diol having formula:

$$HO—CH_2—CHOH—(CH_2)_{nb}—(O)_{nb'}—CH=CH_2 \qquad (XII)$$

wherein nb is an integer from 1 to 12 and nb' is an integer and is 0 or 1;
   $c^3$) unsaturated aliphatic diol having formula:

$$HO—(CH_2)_{v'}—CH=CH—(CH_2)_{v''}—OH \qquad (XIII)$$

wherein v' and v" are numbers higher than 1, such that v'+v" is a number comprised between 2 and 10;
   $c^4$) butadiene oligomers or polymers having a number aaverage molecular weight from 500 to 4,000 functionalized with terminal hydroxyl groups;
   $c^5$) mono-glycerides of $C_{11}$-$C_{24}$ fat acids containing at least one unsaturation, preferably $C_{14}$-$C_{18}$;
   $c^6$) trimethylolpropane monoallylether (TMPA):

$$CH_3—C(CH_2OH)_2—CH_2OCH_2—CH=CH_2$$

with the proviso that when diisocyanate b) is used and the R radical in formula (VIA) is: —Ph—$CH_2$—Ph—, the hydrogenated diols c) are optional; when the R radical has a meaning different from that above indicated, at least one of the used hydrogenated diols c) is selected from those belonging to the $c^2$)-$c^6$) groups;
the amount of the component a) in the final polyurethane being higher than 60% by weight, preferably higher than 70% by weight,
said polyurethanes obtainable by reacting component a) with b), and in a second step the reaction mixture with component c) to remove the —NCO excess, the sum of the equivalents of components a) and c) being equal to the equivalents of component b).

The bifunctional (per)fluoropolyethers indicated in a) have one or more of the following units statistically distributed along the chain: $(C_3F_6O)$; (CFYO) wherein Y is F or $CF_3$; $(C_2F_4O)$; $(CF_2(CF_2)_{x'}CF_2O)$ wherein x' is an integer equal to 1 or 2; $(CR_4R_5CF_2CF_2O)$ wherein $R_4$ and $R_5$ are equal to or different from each other and selected between H, Cl, and wherein one fluorine atom of the perfluoromethylene unit can optionally be substituted with H, Cl or (per)fluoroalkyl, having for example from 1 to 4 carbon atoms.

The preferred bifunctional compounds of a) are the following with the perfluorooxyalkylene units statistically distributed along the chain:

(a') —$CF_2$—O—$(CF_2CF_2O)_{p'}(CF_2O)_{q'}$—$CF_2$—     (VIII)

wherein:
p' and q' are integers such that the q'/p' ratio is comprised between 0.2 and 2 and the number average molecular weight is in the above range for (per)fluoropolyether diols a);

(b') —CFY—O—$(CF_2CF(CF_3)O)_{r'}$—$(CF_2CF_2O)_{s'}$—
   $(CFYO)_{t'}$—CFY—     (IX)

wherein:
Y is as above; r', s' and t' are integers such that r'+s' is in the range 1-50, the ratio t'/(r'+s') is in the range 0.01-0.05, r'+s' being different from zero, and the molecular weight is in the above range for (per)fluoropolyether diols a);

(c') —$CF(CF_3)(OCFY)_{t'}(OC_3F_6)_{u'}$—$OR'_fO$—
   $(C_3F_6O)_{u'}(CFYO)_{t'}CF(CF_3)$—     formula (X)

wherein:
$R'_f$ is a $C_1$-$C_8$ perfluoroalkylene; u'+t' is a number such that the number average molecular weight is in the above indicated range for (per)fluoropolyether diols a); t' can also be equal to zero; Y is as above;

(d') —$CF_2CF_2O$—$(CF_2(CF_2)_{x'}CF_2O)_{v'}$—$CF_2CF_2$—     (XI)

wherein:
v' is a number such that the molecular weight is in the range indicated above for (per)fluoropolyether diols a), x' is an integer equal to 1 or 2;

(e') —$CF_2CH_2$—$(OCF_2CF_2CH_2)_{w'}$—$OR'_fO$—
   $(CH_2CF_2CF_2$     (XII)

wherein:
$R'_f$ is as above; w' is a number such that the number average molecular weight is in the range indicated above for (per)fluoropolyether diols a);
the end groups of the bifunctional perfluoropolyethers component a) being of the type —$CH_2$—$(OCH_2CH_2)_{k'}$—OH, wherein k' is a number comprised between 0 and 5.

The bifunctional (per)fluoropolyoxyalkylenes can be prepared starting from the corresponding (per)fluoropolyoxyalkylenes having —COF end groups (see for example GB 1,104,482, U.S. Pat. No. 3,715,378, U.S. Pat. No. 3,242,218, U.S. Pat. No. 4,647,413, EP 148,482, U.S. Pat. No. 4,523,039, EP 340,740, WO 90/03357, U.S. Pat. No. 3,810,874, EP 239,123, U.S. Pat. No. 5,149,842, U.S. Pat. No. 5,258,110).

The diisocyanates b) are preferably selected from
b¹) hydrogenated diisocyanates;

OCN—$R_H$—NCO     (VIA-1)

wherein $R_H$ has the following meanings:
$C_2$-$C_{12}$ aliphatic bifunctional radical;
$C_6$-$C_{18}$ cycloaliphatic or alkylen-cycloaliphatic, wherein optionally the cycloaliphatic ring can be substituted with one or more $C_1$-$C_3$ alkyl groups, or R contains two cycloaliphatic rings, each having one —NCO group, linked by a $C_1$-$C_6$ alkylene chain;
$C_6$-$C_{18}$ aromatic bifunctional radical, wherein the aromatic ring can be substituted with one or more $C_1$-$C_3$ alkyl groups, or R contains two aromatic rings, each having one —NCO group, linked by a $C_1$-$C_6$ alkylene chain;

b²) fluorinated diisocyanates of general formula:

OCN—$R_{F-L}$—NCO     (VIB)

wherein $R_{F-L}$ has the following meanings:
aliphatic bifunctional radical having formula —$(CH_2)_g$—$(CF_2)_{g'}$—$(CH_2)_g$—     (VIC)

wherein g is an integer and can be 1 or 2, g' is an integer from 2 to 16;
$C_{14}$-$C_{18}$ aromatic bifunctional radical containing two aromatic rings, each having one —NCO group, linked by a $C_2$-$C_6$ perfluoroalkylene chain;
excluding the diisocyanate b) wherein R in formula (VIA) is equal to —Ph—$CH_2$—Ph—.

Preferably the diisocyanates b) are hydrogenated and are selected from the following: hexamethylendiisocyanate (HDI), trimethylhexamethylenediisocyanate, isophorone diisocyanate (IPDI), 4,4'-methylenebis(cyclohexylisocyanate) (H12-MDI), cyclohexyl-1,4-diisocyanate, 4,4'-methylenebis(phenylisocyanate) (MDI) or its isomers, toluene 2,4-diisocyanate (TDI) or its isomers, xylylene diisocyanate, naphthalene-1,5-diisocyanate, p-phenylen-diisocyanate.

Preferably diols c) are selected from the following: butandiol (BDO), butendiol (BDE), 1,2-propandiol (PDO), 3-allyl-oxy-1,2-propandiol (APDO), trimethylolpropane monoallylether (TMPA).

The preferred curable polyurethanes of the present invention comprise component a), component b) wherein R of formula (VIA) is different from —Ph—$CH_2$—Ph—, component c) is a unsaturated diol and is selected from the classes $c^2$)-$c^6$), preferably one or more diols of class $c^2$) and/or $c^6$) are used.

The process for preparing curable polyurethanes is carried out by the following steps:

I. reaction between PFPE diol and diisocyanate in a reactor at the temperature of 90° C., under mechanical stirring, preferably in absence of solvent, in inert nitrogen atmosphere in the presence of Sn catalyst in an amount from 0.01 to 0.03% by weight on the diisocyanate. The reaction is followed by titration of the —NCO end groups according to ASTM 2572, till a constant titre;

II. cooling of the prepolymer obtained in I. at a temperature of 60°-70° C. and addition of the hydrogenated diol in bulk, under strong stirring, which is maintained for a period of time from 5 min to 1 h, until the reaction mixture reaches a Brookfield viscosity of the order of 5-6 Pa·s (determined at 70° C.);

III. discharge of the compound from the reactor in moulds kept at the temperature of 90° C. for 24-48 hours, until complete disappearance of the —NCO group signal at 2260 cm⁻¹ in the IR spectrum.

The sum of the equivalents of the compounds a) and c) is equal to the equivalents of the compound b).

In step I. the ratio, expressed as equivalents, between the perfluoropolyether diol a) and the diisocyanate b) is generally from 1:1 to 1:2.5.

In step II. the reaction mixture obtained in I. is reacted with the diol compound c) to remove the possible —NCO excess. When the unsaturated component c) is not used then the diisocyanate b) has the radical R in formula (VIA): —Ph—$CH_2$—Ph—.

When the diisocyanate b) has the radical R different from —Ph—$CH_2$—Ph—, then the ratio in equivalents b)/a) in step I. is higher than 1 and the compound c) selected from those belonging to the $c^2)-c^6$) groups is used.

The cast-time of the polyurethanes of the present invention is very high and allows to carry out the production of said polymers on an industrial scale.

The obtained polymer appears as a rubbery solid and therefore it can easily be stored and handled.

The curable polyurethanes are used in blends containing a curing agent, optionally crosslinking coagents, fillers and other additives to obtain cured rubbers.

The curing agent can be selected from organic peroxides, sulphur or the dimer of 2,4-toluen diisocyanate.

The organic peroxides are for example selected from the following: dicumyl peroxide, cumyl-t-butyl-peroxide, 2,5-dimethyl-2,5 di(t-butylperoxy)hexane, di-t-butylperoxide, t-butylperoxybenzoate, 1,1-bis(t-butylperoxy)-3,5,5-trimethylcyclohexane, bis(t-butylperoxy)diisopropylbenzene, t-butylperoxy-isopropylcarbonate, etc.

In curing carried out by organic peroxides, an unsaturated polyfunctional compound can be added as a curing coagent, to improve the reticule properties. The curing coagents are for example triallylisocyanurate, triallylcyanurate, trimethallylisocyanurate, triallyltrimellitate, diallylphthalate, trimethylolpropantrimethacrylate, ethylenglycoldiacrylate, N,N'-m-phenylenebis(maleimide) and bisolefins.

The following substances, preferably in the form of micropowders are Examples of fillers usable in the polyurethane compounds according to the present invention are: carbon black, preferably selected from MT (medium thermal black) N990, N991, N907, N908; silica and derivatives, semicrystalline fluoropolymers, i.e. a polymer having at least a glass transition temperature and a melting temperature, preferably said semicrystalline fluoropolymers are selected from PTFE and modified PTFEs.

Preferably the compound has the following composition, wherein the amounts of components (expressed in phr per 100 parts by weight of crosslinkable elastomer) are:
  curing agent: from 0.1 to 6;
  filler: from 0 to 50, preferably from 10 to 40;
  crosslinking coagent: from 0 to 5.

Other additives can be added to the compound: for example antiflame, antioxidant, antifoam, antistatic agents and, generally the additives used in rubbers.

The curing compound is obtained by mixing the various components in the mixer using the conventional rubber tecnologies. For example the mixer can be an open, cylinder or closed (Banbury) type.

After having obtained from the compound the cured manufactured article, a treatment at temperatures in the range 100° and 135° C. can optionally be carried out to remove the optional residual peroxide.

The cured manufactured articles, as said obtainable from the crosslinkable polymers of the invention, are usable as gaskets for low temperatures with good elastomeric properties, also at temperatures lower than −60° C., preferably lower than −70° C. and a Shore A hardness higher than 70. Furthermore said crosslinkable polymers are processable with the conventional rubber technologies in open or closed mixers and have an improved chemical resistance and to solvents. The obtained manufactured articles appear free from bubbles, roughness, surface defects and have a high gloss. This result is unexpected since it is well known that the PFPEs easily solubilize the gases which unavoidably develop during radical curing. Therefore it is surprising that the manufactured article extracted from the press does not show bubbles. Without to be bound to any theory the Applicant believes that this could be explained with the surprisingly low amount of radical initiator which is necessary to obtain a sufficient crosslinking to have the required properties for the indicated applications.

The Applicant has found that the crosslinkable polymers of the invention can be mixed with hydrogenated rubbers to give cured compounds. This makes available modified hydrogenated rubbers which easily are released from the moulds, and which therefore allow to reduce or remove the number of discards obtained by using hydrogenated rubbers. In fact one of the drawbacks of hydrogenated rubbers when they are moulded is that after a limited number of mouldings, the moulds are dirty whereby it is necessary to stop the moulding and to clean the moulds. The modified hydrogenated rubbers as said do not show the problem of the mould dirting whereby from the industrial point of view they are advantageous.

Furthermore the so cured modified hydrogenated rubbers show low surface tension and high contact angle with hydrocarbons. This leads to an improved chemical resistance and to solvents with respect to the non modified hydrogenated rubbers, and to an improved friction coefficient. The so modified hydrogenated rubbers show said effects lasting in the time. Said effects are unexpected since one could not predict that the hydrogenated rubbers and the polymers of the invention co-cured and above all led to macroscopically homogeneous polymers having surface properties such as not to dirty the moulds, i.e. led to manufactured articles defect free. The above properties are combined with good mechanical properties of the manufactured article.

The crosslinkable polymer of the invention can therefore be mixed with one or more uncured hydrogenated rubbers. Examples of hydrogenated rubbers are natural rubber, ethylene/propylene rubbers, butyl, butadiene and styrene rubbers. The ratio by weight between the polyurethane of the present invention and the hydrogenated rubber is from 0.3:100 to 50:100, preferably from 1:100 to 15:100.

The curing agents, crosslinking coagents, fillers and additives used for these rubber mixtures are those above mentioned.

The following Examples illustrate the invention but they do not limit the scope thereof.

EXAMPLES

Characterization Parameters of the Polyurethane:
  Contents of curing sites
    The curing site content is calculated as the number of equivalents of DOUBLE BONDS C=C, i.e., MDI equivalents if said diisocyanate is used in the synthesis, present in 1 kg of polymer.
  Thermal properties
    The thermal properties have been determined by differential scanning calorimetry, according to ASTM D 3417 and D 3418.
  Rheological properties
    The Mooney viscosity has been determined according to ASTM D 1646.
    The Brookfield viscosity has been determined by DV-II+instrument.
  Rheometric characterization of the blend during curing
    The blend rheometric properties have been determined by a rheometer MDR Alpha Tecnologies Mod. 2000E acording to the ASTM D 5289 method.
  Characterization parameters of the manufactured article obtained by blend curing
    Mechanical properties: Shore A hardness according to ASTM D 2240; stress at break, elongation at break, modulus at 100% of elongation, according to ASTM D 412C.
    Surface properties: friction coefficient according to ASTM D 1894; static contact angle measured by Krüss DSA G10 instrument using each of the following liquids: n-octane, n-decane, n-dodecane, n-tetradecane, n-hexadecane. A straight line is drawn and the critical surface tension is extrapolated by using the Zisman method reported in W. A. Zisman, "Contact Angle, Wettability and Adhesion" Advances in Chemistry Series, vol. 43 American Chemical Society, Washington D.C. 1964.

Chemical resistance and resistance to solvents: resistance to the contact with acid/basic substances or with organic solvents, according to ASTM D 471, at 70° C. for 24 h. The chemical resistance and to solvents is expressed as percentage of the specimen swelling.

The percentage by weight of PFPE is calculated from the formula a)×100/[a)+b)+c)].

Dynamic mechanical properties

The dynamic mechanical spectrum has been measured by a Rheometric Ares instrument with a heating gradient of 2° C./min and a frequency of 6.28 rad/sec according to ASTM D 4065.

Example 1

Polyurethane Synthesis According to the Invention by Using a PFPE Diol, a Cycloaliphatic Diisocyanate and an Unsaturated Diol.

In a 250 ml flask, under nitrogen atmosphere, 100 g of a PFPE diol having average number molecular weight (MW) 3,300, and 100 µl of a solution of dibutyltin dilaurate at 5% in butyl acetate are charged under mechanical stirring.

The internal temperature is brought to 90° C. and 16.7 g of isophoron diisocyanate monomer are dropped in the flask in about 1 minute. The solution is reacted for 4 hours and at the end the —NCO titre of the prepolymer is controlled according to ASTM D 2572, which corresponds to the expected titre on the basis of the amounts of the two reactants which have been added.

By maintaining the stirring, it is cooled to 60° C. At said temperature a mixture composed by 1.8 g of propandiol and 3.12 g of propandiol monoallylether are added in bulk. Stirring is continued for 10 minutes. When a Brookfield viscosity of about 5 Pa·s is reached, the obtained liquid mixture is discharged in vessels which are hermetically sealed and conditioned at the temperature of 90° C. for 48 hours.

A sample of the liquid mixture kept at 60° C. reaches a Brookfield viscosity value of 20 Pa·s, which is the viscosity value considered the limit value for the polymer discharge from the reactor, in about 2 hours and 20 minutes, calculated starting from the addition of the hydrogenated diols.

Therefore the cast-time of the polyurethanes of the present invention is very prolonged and allows the polyurethane production on an industrial scale.

At the end of the heating step at 90° C. for 48 hours it is checked that in the IR spectrum of the compound the signal at 2260 cm−1 corresponding to the —NCO group is absent.

At the end a rubbery solid is obtained.

The charaterization of the obtained compound is reported in Table 1.

Example 2

Preparation and Curing of Blends Obtained Starting from the Polyurethane Obtained in Example 1.

100 g of the polymer of Example 1 are charged in a cylinder mixer (width 200 mm, diameter 100 mm), and formulated according to the recipes reported in Table 2. 8 blends having a different composition, corresponding to the Examples 2A-2H, have been in this way prepared.

During the step of the compound preparation, before adding the other blend ingredients, the cylinders must be heated at a temperature of 50°-70° C., so as to obtain a continuous polymer layer on one of the two cylinders.

The rheometric properties of the obtained blends have been determined as indicated above. The analysis conditions are reported in Table 3. The data have been recorded up to 30 minutes, time beyond which the values of the examined parameters remain constant. The minimum torque value ML has not been reported, practically being it always zero since the polymer viscosity is very low.

For the determination of the physical properties, plaques 130×130×2.0 mm have been moulded in a compression press (P=1.5×10$^7$ Pa), at the temperature of 160° C. for a time of 30 minutes. The post-treatment has been carried out by putting the specimens in a forced air circulation stove at the temperature of 120° C. for 24 hours.

The characterization data are reported in Tables 4, 6 and 7.

Example 3

Polyurethane Synthesis According to the Invention by Reacting a PFPE Diol with MDI, Omitting the Hydrogenated Aliphatic Diol In a 250 ml flask, under nitrogen atmosphere 50 g of a PFPE diol MW 3,300, and 22 µl of a dibutyltin dilaurate solution at 5% in butyl acetate are charged under mechanical stirring. The internal temperature is brought to 90° C. and 7.20 g of methylene bis-phenylisocyanate monomer are dropped in the flask in about 1 minute. The mixture is reacted for 3 hours and at the end the prepolymer conversion is controlled by titration as in Example 1.

By maintaining the stirring, it is cooled to 60° C. At said temperature 50 g of the same PFPE diol initially used are added in bulk. Stirring is continued for 10 minutes, then the obtained compound is discharged in vessels which are hermetically sealed and conditioned at the temperature of 90° C. for 48 hours. At the end it is checked that in the IR spectrum of the compound the signal at 2260 cm−1 corresponding to the —NCO group is absent.

At the end of this phase a rubbery solid is obtained.

The charaterization of the obtained compound is reported in Table 1.

Example 4 (Comparative)

Polyurethane Synthesis According to EP 359,273, by Reacting a PFPE Diol with H12-MDI and with a Mixture Formed by Hydrogenated Diols and Triols 18.71 g of methylene bis(cyclohexylisocyanate) monomer dissolved in 29.68 g of ethyl acetate, are charged in a four-necked 500 ml flask, equipped with mechanical stirring, under static nitrogen atmosphere. The internal temperature is brought to 70° C. and 56 µl of a solution of dibutyltin dilaurate at 5% in butyl acetate and 100 g of perfluoropolyether diol having MW 3,500 are added under stirring. After 4 hours the reaction is over (titration according to ASTM D 2572). The solvent is evaporated by distillation under vacuum, it is let cool under stirring to 60° C. and a mixture composed by 1.98 g of 1,4-butandiol and 2.88 g of trimethylolpropane are added in bulk. Stirring is continued for 1 minute, then the viscous liquid compound is poured in a mould.

A sample of the liquid is maintained at 60° C., determining the Brookfield viscosity in the time. It is noticed that the viscosity value of 20 Pa·s is reached, on average, after about 2-3 minutes from the addition of the mixture of the hydrogenated polyols.

Therefore the cast time in this case is very reduced compared with that of Example 1. This is a drawback since, for example, the times of a reactor emptying in an industrial plant are generally much higher than the above indicated time interval.

The polymer is transferred in press at 90° C. for 24 hours.

At the end on a polymer specimen it is checked that in the IR spectrum of the compound the signal at 2260 cm−1 corresponding to the —NCO group is absent.

The final compound appears as an unsoluble opalescent white rubbery solid which is not processable in the mixer since it is already crosslinked.

Example 5 (Comparative)

Polyurethane Bbtainment According to U.S. Pat. No. 5,962, 611, having a Double Bond at Each End, by Reacting a PFPE Diol with a Diisocyanate and a Monoisocyanate Acrylate.

125 g of a perfluoropolyether diol having MW 3,300, 249 μl of a dibutyltin dilaurate solution at 5% in butyl acetate and 1 mg of p-hydroquinone, to stabilize the isocyanateethyl methacrylate which is subsequently added, were charged in a 250 ml four-necked flask, equipped with mechanical stirring, under static nitrogen atmosphere. The internal temperature was brought to 90° C., maintaining the mixture under stirring. Then 4.16 g of isophoron diisocyanate monomer have been dropped in the flask in about 1 minute. The reaction is continued for 2 hours. After having checked the absence of residual free isocyanate (absorption signal at 2260 cm$^{-1}$ in the IR spectrum) the system is let cool, by maintaining the stirring, to the temperature of 60° C., and 5.8 g of 2-isocyanateethyl methacrylate have been added in bulk. Stirring is continued for 2 hours, checking at the end the absence of residual free isocyanate as indicated above. The compound which appears as a transparent liquid having Brookfield viscosity 3.36 Pa·s at 25° C., is discharged.

The properties of the obtained compound are reported in Table 1.

Example 6 (Comparative)

Curing of the Blend Prepared by Using the Polyurethane of Example 5 (Comparative)

100 g of the compound obtained in Example 5 (comparative) were added to 5 g of Celite 350, 0.2 g of triallylcyanurate, 0.3 g of dicumylperoxide and 30 g of carbon black MT N990. A high shear disperser was used, obtaining a homogeneous compound after 10 minutes of mixing at 1,500 rev/min.

After the blend has been degassed under vacuum for 15 minutes, curing was carried out in press at the temperature of 160° C. for 20 minutes. Subsequently the compound was subjected to post-treatment in stove at 120° C. for 8 hours. The properties of the cured material are reported in Tables 6 and 7.

The carbon black amount used in the blend corresponds to the highest amount used in Examples 2A-2H.

Example 7

Preparation and Curing of a Blend Obtained by Using the Polyurethane of the Invention (Example 3) in Admixture with a Hydrogenated Rubber (EPDM).

The blend is prepared by initially charging in a cylinder mixer (width 300 mm, diameter 150 mm), 190 g of EPDM Keltan® 312 and 10 g of polymer of Example 3, processing them until obtaining a visually homogeneous mixture.

The following additives were then added: 10 g of di(t-butylperoxyisopropyl)benzene (Perkadox® 14/40 B, Akzo Nobel), 6 g of polyethylene AC 617A, 10 g of ZnO, 0.4 g of oleamide (Armid-O®, Akzo Nobel), 1 g of polymerized 2,2,4-trimethyl-1,2-dihydroquinoline (Flectol® TMQ, Flexsys), 100 g of carbon black FEF N550, and mixing was continued until homogeneization.

Two plaques having a thickness of 2 mm were obtained from the blend by compression moulding (temperature of 170° C. for 30 minutes).

The curing rheometric properties are reported in Table 3.

The plaques were characterized by determination of the mechanical properties and of the static contact angle. The results are reported in Tables 5 and 6.

By repeating the blend preparation, further 10 plaques were moulded, using a multiimpression compression mould for O-ring 111 (containing No. 111 O-ring) at a temperature of 170° C. for 20 minutes, evaluating the releasability from the mould at the end of each step, omitting the mould cleaning before proceeding to the subsequent step. 100% of O-ring free from defects ar obtained until the last moulding.

Example 8 (Comparative)

Curing of a Blend Prepared Starting from a Hydrogenated Rubber (EPDM)

By following the procedure described in Example 7, a blend is prepared with the same additives in the same amounts, but starting from 200 g of EPDM.

Two plaques having a thickness of 2 mm, characterized by measures of friction coefficient on metal, of mechanical properties and static contact angle, were compression moulded from the blend (temperature of 170° C. for 30 minutes).

The results of these characterizations are reported in Table 4.

The same releasability test from the mould described in Example 7 was carried out. The defectiveness after the last moulding, evaluated as indicated in Example 7, was of 20%.

Therefore the presence of the invention polymer in admixture with EPDM in the blends guarantees the absence of defectiveness of the manufactured articles obtained by EPDM moulding, and allows to avoid the mould cleaning also after several mouldings.

Example 9 (Comparative)

Polyurethane Synthesis According to EP 621,298 Starting from a PFPE Diol with MDI and a Saturated Aliphatic Hydrogenated Diol.

In a three-necked flask 100 ml of anhydrous ethyl acetate and 17.68 g (0.14 equivalents) of 4,4'-methylenebis(phenylisocyanate), were charged under nitrogn atmosphere and with mechanical stirring. The internal temperature was then increased to 70° C. and 100 g (0.07 equivalents) of a per-fluoropolyether diol having average number molecular weight MW=2,825 were dropped in two hours. When dropping was over, the mixture was maintained at 80° C. under mechanical stirring for further 30 minutes. The ethyl acetate was removed by distillation and the mixture was cooled to 70° C. and then degassed. Then 3.03 g (0.067 equivalents) of butandiol were added, by strongly stirring for 45 seconds. The so obtained mixture was poured in a mould and maintained first at 220° C. for 1.5 minutes and then at 130° C. for 7 hours. The compound was then released from the mould and put at room temperature for one week before characterization.

The results of the chemical resistance and to solvents tests carried out on the polymer of the present Example are reported in Table 4.

Example 10

Comments on the Data of Table 4

Table 4 reports the values of chemical resistance and to solvents of plaques obtained by curing of the blends of Examples 2B-2D, 4 comp. and 9 comp. The chemical resistance and to solvents has been evaluated by determining the % volume increase of the manufactured article after dipping in the liquid for 24 hours at 70° C.

The comparison among the values relating to Examples 2B, 2C and 2D shows that the chemical resistance and to solvents of the polyurethanes according to the present invention is not influenced by the increase of the carbon black content in the blend (for the the composition of the blends of Examples 2B-2D, see Table 2).

The comparison of the values relating to Examples 2B-2D with those relating to Example 4 comp. shows that the chemical resistance and to solvents of the polyurethanes according to the present invention is comparable, however the resistance to solvents (toluene) is clearly higher with respect to the polymers obtained according to EP 359,273. (Example 4 comp.).

The comparison of the values relating to Examples 2B-2D with those relating to Example 9 comp. shows that the chemical resistance and to solvents of the polyurethanes according to the present invention is clearly better than that of the polymers obtained according to EP 621,298.

Example 11

Comments on the Data of Table 5

Table 5 reports the contact angle values determined on plaques obtained by curing of the blends of Examples 7 and 8 comp.

The comparison of the values relating to Example 7 (fluoroadditivated EPDM) with those relating to Example 8 comp. (EPDM as such) shows that the EPDM additivation with a polyurethane according to the present invention allows to obtain high contact angle values with hydrocarbons, while for non additivated EPDM it is not possible the contact angle measurement since the drop is immediately absorbed by the polymer. The $\gamma_c$ value of EPDM added with the polyurethane of the invention is typical of an oleorepellent surface.

Example 12

Comments on the Data of Tables 6 and 7

In Table 6 the values relating to the mechanical properties of specimens obtained by curing of the blends of Examples 2A-2H, 6 comp., 7, 8 comp., are reported.

The values relating to Example 2A show that the polyurethanes according to the present invention, when cured without the addition of additives and fillers, have mechanical properties comparable with the values reported in EP 359,273. Besides, unlike the manufactured articles prepared from polyurethanes obtainable according to EP 359,273, whose properties cannot be improved since the polymers are not additionable, as explained above, the polyurethanes according to the present invention additivated with various compositions of fillers and/or additives improve, and allow to vary, in function of the application requirements, their mechanical properties, in particular the Shore A hardness and the elongation at break. From the dynamic mechanical measurement it is furthermore noticed that the curing and the presence of fillers do not affect the Tg value, which remains at −100° C., guaranting the maintenance of good elastomeric properties also at very low temperatures for each composition.

The comparison of the Shore A hardness value for the specimen of Example 6 comp. and that for the specimen of Example 2D shows that, the blend composition being equal, a polymer obtained according to U.S. Pat. No. 5,962,611 is characterized by a notably lower Shore A hardness value with respect to a polyurethane obtained according to the present invention.

The comparison of the values relating to Example 7 with those relating to Example 8 comp. shows that the addition of a polyurethane according to the present invention to an EPDM blend maintains practically unchanged the hardness and 100% elongation modulus values typical of EPDM, improving however the elongation at break and stress at break parameters.

TABLE 1

Characterization of the polymers of Examples 1, 3, 4 comp. and 5 comp. In Table PU means polyurethane

| Parameters | Ex. 1 | Ex. 3 | Ex. 4 comp. | Ex. 5 comp. |
|---|---|---|---|---|
| Curing sites (eq/Kg) | 0.129 | 0.268 | 0 | 0.277 |
| DSC transitions (Tg, ° C.) | −110 +55 | −113 +8 | | |
| Not cured hardness (shore A) | 50/55 | 0 | — | 0 |
| Mooney viscosity ML 1 + 10 (100° C.) | 10 ± 5 | — | — | — |
| Brookfield viscosity (Pa · s) | — | — | — | 3.36 |
| % PFPE in PU (calculated) | | | | |

TABLE 2

Composition of the blends of Example 2. The additive amounts are expressed in g of additive/100 g of polymer (phr)

| Additives | 2A | 2B | 2C | 2D | 2E | 2F | 2G | 2H |
|---|---|---|---|---|---|---|---|---|
| dicumylperoxide | 0.3 | 0.3 | 0.3 | 0.3 | 0.3 | 0.3 | 0.3 | 0.4 |
| triallylcyanurate | 0 | 0.2 | 0.2 | 0.2 | 0 | 0.5 | 0.2 | 0.2 |
| celite 350 | 0 | 5 | 5 | 5 | 5 | 5 | 5 | 5 |
| carbon black MT N990 | 0 | 10 | 20 | 30 | 20 | 20 | 0 | 0 |
| carbon black MT LS | 0 | 0 | 0 | 0 | 0 | 0 | 20 | 30 |

TABLE 3

Curing rheometry in the Examples of the invention
(MDR 160° C., arc 0.5°, 30 minutes)
In the Table MH is measure in lbf · in and t in minutes.

| | Examples | | | | | | | | | |
|---|---|---|---|---|---|---|---|---|---|---|
| | 2A | 2B | 2C | 2D | 2E | 2F | 2G | 2H | 7 | 8 comp. |
| MH | 5.75 | 9.0 | 9.4 | 10.5 | 8.5 | 8.5 | 9.8 | 13.7 | 28.5 | 28.0 |
| ts1 | 1.32 | 1.1 | 1.39 | 1.29 | 1.37 | 1.59 | 1.02 | 0.75 | n.d. | n.d. |
| t' 50 | 3.04 | 3.38 | 4.71 | 4.79 | 4.51 | 5.49 | 4.08 | 3.32 | 5.36 | 5.21 |
| t' 90 | 7.2 | 8.7 | 13.5 | 13.5 | 13.0 | 15.6 | 11.3 | 8.9 | 16.8 | 16.4 |

TABLE 4

Chemical resistance and to solvents of plaques obtained by curing of the blends of Examples 2B-2D, 4 comp. and 9 comp. The chemical resistance has ben evaluated by determining the % volume increase of the manufactured article after dipping in the liquid for 24 hours at 70° C.
(ΔVol %)

| Parameters | Ex. 2B | Ex. 2C | Ex. 2D | Ex. 4 comp. | Ex. 9 comp. |
|---|---|---|---|---|---|
| $H_2SO_4$ 3% by wt. | 0.64 | 0.72 | 0.82 | 0.8 | 1.1 |
| $H_2SO_4$ 30% by wt. | 0.40 | 0.41 | 0.26 | — | 0.55 |
| NaOH 10% by wt. | 0.64 | 0.53 | 0.62 | 0.5 | 0.93 |
| NaOH 30% by wt. | 0.42 | 0.59 | 0.51 | — | 0.70 |
| Fuel C | 16.9 | 16.0 | 15.1 | — | 22.0 |
| Toluene | 14.7 | 14.1 | 13.1 | 21.5 | 28.9 |

TABLE 5

Contact angles determined on plaques obtained by curing of the blends of Examples 7, 8 comp. The contact angles with the solvents are determined in degrees and the surface critical tension $\gamma_c$ has been determined in mN/m according to the Zisman method

| | Ex. 7 | Ex. 8 comp. |
|---|---|---|
| n-octane | 50 | — |
| n-decane | 60 | — |
| n-dodecane | 67 | — |
| n-tetradecane | 70 | — |
| n-hexadecane | 72 | 33 |
| $\gamma_c$ | 15.3 | n.d. |

TABLE 6

Mechanical properties of the manufactured articles obtained after curing of the blends of Examples 2A, 2B, 2C, 2D, 2E, 2G, 2H, 6 comp., 7, 8 comp.
In the Table Shore A indicates the Shore A hardness, 100% modulus means 100% elongation modulus.

| | Examples | | | | | | | | | |
|---|---|---|---|---|---|---|---|---|---|---|
| | 2A | 2B | 2C | 2D | 2E | 2G | 2H | 6 comp. | 7 | 8 comp |
| Shore A | 63 | 73 | 74 | 78 | 74 | — | 79 | 53 | 72 | 72 |
| elong. at break % | 265 | 177 | 216 | 188 | 217 | — | 161 | — | 206 | 180 |
| stress at break MPa | 6.5 | 8.5 | 10.1 | 10.2 | 10.0 | — | 9.7 | — | 18.7 | 6.5 |
| 100% modulus MPa | 2.6 | 5.3 | 5.8 | 7.0 | 5.9 | — | 7.8 | — | 5.4 | 6.4 |
| Tg (° C.) | −100 +55 | −100 +55 | −100 +30 | −100 +54 | n.d. | — | n.d. | n.d. | n.d. | n.d. |

TABLE 7

Mechanical properties of the manufactured articles post treated as described in the Examples, obtained by using the blends of Examples 2C, 2D, 2E, 2G, 2H and 6 comp.

| | Examples | | | | | |
|---|---|---|---|---|---|---|
| | 2C | 2D | 2E | 2G | 2H | 6 comp |
| Shore A hardness | 75 | 80 | 76 | 77 | 82 | 57 |
| elongation at break % | 196 | 156 | 208 | 168 | 143 | — |
| stress at break MPa | 11 | 11.3 | 10.2 | 9.8 | 10.7 | — |
| elongation modulus 100% MPa | 6.1 | 8.3 | 5.9 | 6.9 | 8.8 | — |

The invention claimed is:

1. Cured manufactured articles obtained from compositions comprising:
   hydrogen-containing rubbers,
   a curing agent, and
   curable perfluoropolyether polyurethanes obtained by reaction among the following compounds
   a) perfluoropolyether diols having a number average molecular weight from 2,000 to 5,000;
   b) diisocyanates of formula $$OCN-R-NCO \quad (VIA)$$

wherein R is a hydrogen-containing and/or fluorinated radical;
   c) hydrogen-containing diols selected from one or more of the following:
   $c^1$) $C_2$-$C_{12}$ aliphatic diols;
   $c_{1A}$) $C_6$-$C_{18}$ (alkyl)cycloaliphatic or (alkyl)aromatic diols, optionally comprising in the molecule two aliphatic or aromatic rings having 6 carbon atoms;
   $c^2$) unsaturated aliphatic diol having formula:

$$HO-CH_2-CHOH-(CH_2)_{nb}-(O)-_{nb'}-CH=CH_2 \quad (XII)$$

wherein nb is an integer from 1 to 12 and nb' is an integer and is 0 or 1;
   $c^3$) unsaturated aliphatic diol having formula:

$$HO-(CH_2)_{v'}-CH=CH-(CH_2)_{v''}-OH \quad (XIII)$$

wherein v' and v" are numbers higher than 1, such that v'+v" is a number comprised between 2 and 10;
   $c^4$) butadiene oligomers or polymers having a number average molecular weight from 500 to 4,000 functionalized with terminal hydroxyl groups;
   $c^5$) mono-glycerides of $C_{11}$-$C_{24}$ fat acids containing at least one unsaturation;
   $c^6$) trimethylolpropane monoallylether (TMPA):

$$CH_3-C(CH_2OH)_2-CH_2OCH_2-CH=CH_2$$

with the proviso that:
   when diisocyanate b) is used wherein R in formula (VIA) is different from —Ph—CH$_2$—Ph—, at least one of the hydrogen-containing diols c) is used, selected from those belonging to the $c^2$)-$c^6$) groups;
   the amount of the component a) in the final polyurethane being higher than 60% by weight, said polyurethanes being obtained by reacting component a) with b), and in a second step the reaction mixture with component c) to remove the —NCO excess, the sum of the equivalents of components a) and c) being equal to the equivalents of component b).

2. Cured manufactured articles according to claim 1, wherein in the polyurethanes the perfluoropolyether diols indicated in a) have one or more of the following units statistically distributed along the chain: ($C_3F_6O$); (CFYO) wherein Y is F or $CF_3$; ($C_2F_4O$); ($CF_2/CF_2)_{x'}CF_2O$) wherein x' is an integer equal to 1 or 2; ($CR_4R_5CF_2CF_2O$) wherein $R_4$ and $R_5$ are equal to or different from each other and selected between H, Cl, and wherein one fluorine atom of the —$CF_2$ unit can optionally be substituted with H, Cl or (per)fluoroalkyl, having from 1 to 4 carbon atoms.

3. Cured manufactured articles according to claim 2, wherein in the polyurethanes the perfluoropolyether compounds a) are selected from the group consisting of the following with the perfluorooxyalkylene units statistically distributed along the chain:

$$(a'): -CF_2O-(CF_2CF_2O)_{p'}(CF_2O)_{q'}-CF_2 \quad (VIII)$$

wherein: p' and q' are numbers such that the q'/p' ratio is comprised between 0.2 and 2 and the number average molecular weight is in the above indicated range for perfluoropolyether diols a);

$$(b'): -CFY-O-(CF_2CF(CF_3)O)_{r'}-(CF_2CF_2O)_{s'}-(CFYO)_{t'}-CFY- \quad (IX)$$

wherein:
   Y is as defined in claim 2; r', s' and t' are numbers such that r'+s' is in the range 1-50, the ratio t'/(r'-+s') is in the range 0.01-0.05, r'+s' being different from zero, and the molecular weight is in the above range for perfluoropolyether diols a);

$$(c'): -CF(CF_3)(OCFY)_{t'}(OC_3F_6)_{u'}-OR'_fO-(C_3F_6O)_{u'}(CFYO)_{t'}CF(CF_3)- \quad (X)$$

wherein:
   $R'_f$ is a $C_1$-$C_8$ perfluoroalkylene; u'+t' is a number such that the number average molecular weight is in the range indicated for perfluoropolyether diols a); t' can also be equal to zero; Y is as above;

$$(d'): -CF_2CF_2O-(CF_2(CF_2)_{x'}CF_2O)_{v'}-CF_2CF_2- \quad (XI)$$

wherein:
   v' is a number such that the molecular weight is in the range indicated for perfluoropolyether diols a), x' is an integer equal to 1 or 2; and $$(e'): -CF_2CH_2-(OCF_2CF_2CH_2)_{w'}-OR'_fO-(CH_2CF_2CF_2O)_{w'}-CH_2CF_2- \quad (XII)$$

wherein:
   $R'_f$ is as above; w' is a number such that the number average molecular weight is in the range indicated above for perfluoropolyether diols a); the end groups of the perfluoropolyethers component a) being —$CH_2$—(OCH$_2$CH$_2$)$_{k'}$—OH, wherein k' is a number comprised between 0 and 5.

4. Cured manufactured articles according to claim 1, wherein in the polyurethanes the diisocyanates b) are selected from the group consisting of:
   $b^1$) hydrogen-containing diisocyanates;

$$OCN-R_H-NCO \quad (VIA-1)$$

wherein $R_H$ has the following meanings:
   $C_2$-$C_{12}$ aliphatic bifunctional radical;
   $C_6$-$C_{18}$ cycloaliphatic or alkylen-cycloaliphatic, wherein optionally the cycloaliphatic ring is substituted with one or more $C_1$-$C_3$ alkyl groups;
   $C_6$-$C_{18}$ aromatic bifunctional radical, wherein the aromatic ring is substituted with one or more $C_1$-$C_3$ alkyl groups, or $R_H$ contains two aromatic rings, each having one —NCO group, linked by a $C_1$-$C_6$ alkylene chain; and b²) fluorinated diisocyanates of general formula;

$$OCN—R_{F-L}—NCO \qquad (VIB)$$

wherein $R_{F-L}$ has the following meanings:
aliphatic bifunctional radical having formula $$—(CH_2)_g—(CF_2)_{g'}—(CH_2)_g— \qquad (VIC)$$

wherein g is an integer and can be 1 or 2, g' is an integer from 2 to 16;

$C_{14}$-$C_{18}$ aromatic bifunctional radical containing two aromatic rings, each having one —NCO group, linked by $C_2$-$C_6$ perfluoroalkylene chain;

excluding the diisocyanate b) wherein $R_H$ in formula (VIA-1) is equal to $$—PH—CH_2—PH—.$$

5. Cured manufactured articles according to claim 4, wherein in the polyurethanes the diisocyanates b) are hydrogen-containing.

6. Cured manufactured articles according to claim 1, wherein in the polyurethanes the diols c) are selected from the group consisting of: butandiol (BDO), butendiol (BDE), 1,2-propandiol (PDO), 3-allyloxy-1,2-propandiol (APDO), and trimethylolpropane monoallylether (TMPA).

7. Cured manufactured articles according to claim 1, wherein the polyurethanes comprise component b) wherein R of formula (VIA) is different from —Ph—$CH_2$—Ph—, and component c) is selected from the unsaturated diols of the classes c²) and/or c⁶).

8. Cured manufactured articles according to claim 1, wherein in the polyurethanes the perfluoropolyether diols indicated in a) have a number average molecular weight from 2,500 to 4,000.

9. Cured manufactured articles according to claim 1, wherein in the amount of the component a) in the final polyurethane is higher than 70% by weight.

10. Cured manufactured articles according to claim 1, wherein in the c⁵) mono-glycerides are of $C_{14}$-$C_{18}$ fat acids containing at least one unsaturation.

11. Curable compositions comprising hydrogen-containing rubbers, a curing agent and curable polyurethanes obtained by reaction among the following compounds:
a) perfluoropolyether diols having a number average molecular weight from 2,000 to 5,000;
b) diisocyanates of formula $$OCN—R—NCO \qquad (VIA)$$

wherein R is a hydrogen-containing and/or fluorinated radical;

c) hydrogen-containing diols selected from one or more of the following:
c¹) $C_2$-$C_{12}$ aliphatic diols;
$c_{1A}$) $C_6$-$C_{18}$ (alkyl)cycloaliphatic or (alkyl)aromatic diols, optionally comprising in the molecule two aliphatic or aromatic rings having 6 carbon atoms;
c²) unsaturated aliphatic diol having formula:

$$HO—CH_2—CHOH—(CH_2)_{nb}—(O)_{nb'}—CH=CH_2 \qquad (XII)$$

wherein nb is an integer from 1 to 12 and nb' is an integer and is 0 or 1;

c³) unsaturated aliphatic diol having formula:

$$HO—(CH_2)_{v'}—CH=CH—(CH_2)_{v''}—OH \qquad (XIII)$$

wherein v' and v'' are numbers higher than 1, such that v'+v'' is a number comprised between 2 and 10;

c⁴) butadiene oligomers or polymers having a number average molecular weight from 500 to 4,000 functionalized with terminal hydroxyl groups;

c⁵) mono-glycerides of $C_{11}$-$C_{24}$ fat acids containing at least one unsaturation;

c⁶) trimethylolpropane monoallylether (TMPA):

$$CH_3—C(CH_2OH)_2—CH_2OCH_2—CH=CH_2$$

with the proviso that:
when diisocyanate b) is used wherein R in formula (VIA) is different from —Ph—$CH_2$—Ph—, at least one of the hydrogen-containing diols c) is used, selected from those belonging to the c²)-c⁶) groups;
the amount of the component a) in the final polyurethane being higher than 60% by weight, said polyurethanes being obtained by reacting component a) with b), and in a second step the reaction mixture with component c) to remove the —NCO excess, the sum of the equivalents of components a) and c) being equal to the equivalents of component b).

12. Curable compositions according to claim 11, wherein in the polyurethanes the perfluoropolyether diols indicated in a) have one or more of the following units statistically distributed along the chain: ($C_3F_6O$); (CFYO) wherein Y is F or $CF_3$; ($C_2F_4O$); ($CF_2(CF_2)_xCF_2O$) wherein x' is an integer equal to 1 or 2; ($CR_4R_5CF_2CF_2O$) wherein $R_4$ and $R_5$ are equal to or different from each other and selected between H, Cl, and wherein one fluorine atom of the —$CF_2$ unit can optionally be substituted with H, Cl or (per) fluoroalkyl, having from 1 to 4 carbon atoms.

13. Curable compositions according to claim 12, wherein in the polyurethanes the perfluoropolyether compounds a) are selected from the group consisting of the following with the perfluorooxyalkylene units statistically distributed along the chain:

$$(a'): —CF_2O—(CF_2CF_2O)_{p'}(CF_2O)_{q'}—CF_2 \qquad (VIII)$$

wherein:
p' and q' are numbers such that the q'/p' ratio is comprised between 0.2 and 2 and the number average molecular weight is in the above indicated range for perfluoropolyether diols a);

$$(b'): —CFYO—(CF_2CF(CF_3)O)_{r'}—(CF_2CF_2O)_{s'}—(CFYO)_{t'}—CFY— \qquad (IX)$$

wherein:
Y is F or $CF_3$; r', s' and t' are numbers such that r'+s' is in the range 1-50, the ratio t'/(r'+s') is in the range 0.01-0.05, r'+s' being different from zero, and the molecular weight is in the above range for perfluoropolyether diols a);

$$(c'): —CF(CF_3)(OCFY)_{t'}(OC_3F_6)_{u'}—OR'_fO—(C_3F_6O)_{u'}(CFYO)_{t'}CF(CF_3)— \qquad (X)$$

wherein:
$R'_f$ is a $C_1$-$C_8$ perfluoroalkylene; u'+t' is a number such that the number average molecular weight is in the range indicated for perfluoropolyether diols a); t' can also be equal to zero; Y is as above;

$$(d'): —CF_2CF_2O—(CF_2(CF_2)_{x'}CF_2O)_{v'}—CF_2CF_2— \qquad (XI)$$

wherein:
v' is a number such that the molecular weight is in the range indicated for perfluoropolyether diols a), x' is an integer equal to 1 or 2; and $$(e'): —CF_2CH_2—(OCF_2CF_2CH_2)_{w'}—OR'_fO—(CH_2CF_2CF_2O)_{w'}—CH_2CF_2 \qquad (XII)$$

wherein:

R'$_f$ is as above; w' is a number such that the number average molecular weight is in the range indicated above for perfluoropolyether diols a); the end groups of the perfluoropolyether component a) being —CH$_2$—(OCH$_2$CH$_2$)$_{k'}$—OH, wherein k' is a number comprised between 0 and 5.

14. Curable compositions according to claim 11, wherein in the polyurethanes the diisocyanates b) are selected from the following:

b$^1$) hydrogen-containing diisocyanates;

$$OCN-R_H-NCO \quad (VIA-1)$$

wherein R$_H$ has the following meanings:

C$_2$-C$_{12}$ aliphatic bifunctional radical;

C$_6$-C$_{18}$ cycloaliphatic or alkylen-cycloaliphatic, wherein optionally the cycloaliphatic ring is substituted with one or more C$_1$-C$_3$ alkyl groups;

C$_6$-C$_{18}$ aromatic bifunctional radical, wherein the aromatic ring is substituted with one or more C$_1$-C$_3$ alkyl groups, or R$_H$ contains two aromatic rings, each having one —NCO group, linked by a C$_1$-C$_6$ alkylene chain; and b$^2$) fluorinated diisocyanates of general formula;

$$OCN-R_{F-L}-NCO \quad (VIB)$$

wherein R$_{F-L}$ has the following meanings:

aliphatic bifunctional radical having formula $$-(CH_2)_g-(CF_2)_{g'}-(CH_2)_g- \quad (VIC)$$

wherein g is an integer and can be 1 or 2, g' is an integer from 2 to 16;

C$_{14}$-C$_{18}$ aromatic bifunctional radical containing two aromatic rings, each having one —NCO group, linked by C$_2$-C$_6$ perfluoroalkylene chain;

excluding the diisocyanate b) wherein R$_H$ in formula (VIA-1) is equal to

—PH—CH$_2$—PH—.

15. Curable compositions according to claim 14, wherein in the polyurethanes the diisocyanates b) are hydrogen-containing.

16. Curable compositions according to claim 11, wherein in the polyurethanes the diols c) are selected from the group consisting of: butandiol (BDO), butendiol (BDE), 1,2-propandiol (PDO), 3-allyloxy-1,2-propandiol (APDO), and trimethylolpropane monoallylether (TMPA).

17. Curable compositions according to claim 11, comprising component a), component b) wherein R of formula (VIA) is different from —Ph—CH$_2$—Ph—, and component c) is selected from the unsaturated diols of the classes c$^2$) and/or c$^6$).

18. Curable compositions according to claim 11, wherein the ratio by weight between the polyurethanes and the hydrogen-containing rubber is from 0.3:100 to 50:100.

19. Curable compositions according to claim 11, wherein in the polyurethanes the perfluoropolyether diols indicated in a) have a number average molecular weight from 2,500 to 4,000.

20. Curable compositions according to claim 11, wherein in the c$^5$) mono-glycerides are of C$_{14}$-C$_{18}$ fat acids containing at least one unsaturation.

21. Curable compositions according to claim 11, wherein in the amount of the component a) in the final polyurethane is higher than 70% by weight.

22. Curable compositions according to claim 18, wherein the ratio by weight between the polyurethanes and the hydrogen-containing rubber is from 1:100 to 15:100.

* * * * *